United States Patent Office 3,664,821
Patented May 23, 1972

3,664,821
SLIMICIDAL COMPOSITION AND ITS USE
Bernard F. Shema, Glenside, Robert H. Brink, Jr.,
Doylestown, and Paul Swered, Philadelphia, Pa., assignors to Betz Laboratories, Inc., Trevose, Pa.
No Drawing. Filed Jan. 2, 1970, Ser. No. 466
Int. Cl. A01n 9/00, 9/28
U.S. Cl. 71—67
12 Claims

ABSTRACT OF THE DISCLOSURE

The present invention relates to certain processes and compositions useful for inhibiting the growth of slime in water employed for industrial purposes, particularly water employed in the manufacture of pulp and paper, water employed in cooling water systems, as well as other industrial waters. The novel processes and compositions of the present invention are processes or mixtures which show unexpected synergistic activity against microorganisms, including bacteria, fungi and algae, which produce slimes in aqueous systems or bodies which are objectionable from either an operational or aesthetic point of view. Specifically, the invention is directed to the use of compositions comprising a combination of bis-(trichloromethyl) sulfone with a mixture of 2-nitro-2-ethyl-1,3-dimorpholino propane, and N(2-nitrobutyl) morpholine.

BACKGROUND OF THE INVENTION

The novel compositions of the present invention are combinations comprising from about 5% to 95% by weight of bis-(trichloromethyl)-sulfone and from about 95% to 5% by weight of a mixture of 2-nitro-2-ethyl dimorpholino propane and N(2-nitrobutyl) morpholine. When the two ingredients are mixed in the stated amounts, the resulting combinations possess a high degree of slimicidal activity which could not have been predicted beforehand from the known activity of the individual ingredients comprising the mixture. By means of the present invention, it is therefore possible to produce a more effective slime-control agent than has previously been available. It is a particular advantage of the present invention that the compositions may be made more economically than slimicides generally used in industry.

Bis-(trichloromethyl)-sulfone (also called N-1386) is a known compound, and its preparation has previously been described in the literature. See U.S. Pats. 2,959,517 and 2,628,982.

The mixture of 2 - nitro-2-ethyl-1,3-dimorpholino propane and N(2-nitrobutyl) morpholine which is commercially available as Vancide F–5386, generally comprises on a weight basis 50% of each ingredient and is also known to possess biocidal activity.

Bis-(trichloromethyl) sulfone has demonstrated high efficiencies in the control of microorganisms present in the aqueous systems utilized in the manufacture of paper products, e.g., paper mill white water, and in cooling, e.g., the water used in cooling towers, air washers, and the like. The presence of microorganisms in such systems generally impairs their efficiency and in the case of paper and pulp products may irreparably contaminate and/or reduce the quality and production rate of the final product.

However, these sulfones cause lachrymation at comparatively low levels. For example, the presence of as little as 10 parts per million of these compounds in the white water of a paper mill may cause extreme discomfort to the operating personnel. While higher concentrations may often be employed in cooling water, the same problems are experienced during unusual wind conditions, or if the cooling tower or air washer is located in proximity to an inhabited structure or area, or an air intake leading to such a structure or area.

Accordingly, it is an object of the present invention to provide biocidal compositions which are effective at low concentrations against the microorganisms present in the water employed in paper and pulp mills, cooling systems, and the like. Most desirable, of course, is the provision of biocidal compositions which utilize the biocidal effectiveness of the particular sulfone, while avoiding or reducing the lachrymation problem which otherwise attends the use of these compounds.

The objects of the invention are achieved by combining bis-(trichloromethyl) sulfone with a mixture of 2-nitro-2-ethyl - 1,3 - dimorpholino propane and N(2-nitrobutyl) morpholine. By means of such a combination, the total quantity of biocide required for effective treatment may be reduced. In addition, the high degree of biocidal effectiveness which is provided by the sulfone may be exploited without the realization of a lachrymation problem. Furthermore, the combination provides an unexpected synergistic relationship in which the cooperative action of the combined ingredients yields a total effect which is greater than the sum of the effects of the two ingredients taken separately.

To demonstrate the synergism which is provided by the inventive combinations of compounds, as well as the effectiveness of the low concentrations of bis-(trichloromethyl) sulfone which are made possible in the highly effective biocidal compositions of the invention, the data set forth in Table I has been prepared.

Example 1

The synergism of the compositions of the present invention is shown in Table I below. These tests were made in the laboratory with an agar substrate procedure. This procedure in this example consists of adding the material under test to a nutrient substrate in the amount to give the desired concentration in parts per million. The medium used for the bacteria (*Aerobacter aerogenes*) is nutrient agar. The inhibiting concentration is that concentration which does not support the growth of the test organisms. The values expressed in Table I are obtained by calculating a value from the inhibiting concentrations. The data show the existence of synergism to a marked degree in all cases. The values reported are the sums of the ratios $QA \div Qa$ and $QB \div Qb$. QA and QB are the quantities of compound A and compound B used in the mixture, producing an end point, and $Qa$ and $Qb$ are the minimum inhibitory concentrations of Compounds A and B, respectively, which will produce an end point. When the sum of this value is 1, the effect is the same as the toxic effect of each of the components of the mixture and there is no synergism. When the sum of the ratio is greater than 1, the compounds are not compatible (one detracts from the effect of the other) and there is no synergism.

As may be seen by inspection of Table I, all of the compositions of the present invention produce a synergistic effect against the test organisms.

TABLE I

Synergism summary of varying percentages of bis-(trichloromethyl)-sulfone (referred to as "sulfone") and the 50-50 mixture of 2-nitro-2-ethyl-1,3-dimorpholino propane and N-(2-nitrobutyl) morpholine (referred to as the "mixture")

TEST ORGANISM—AEROBACTER AEROGENES

| Percent | | Synergistic index $(QA \div Qa)$ |
|---|---|---|
| Sulfone | Mixture | $+(QB \div Qb)$ |
| 95 | 5 | .84 |
| 50 | 50 | .62 |
| 5 | 95 | .53 |

It will be evident from the data recorded above that compositions of the present invention function to control slime growth due to microorganisms not only at equal portions of the respective ingredients but also where just minor amounts of one or the other ingredient is present. This finding of synergism at the lower levels is extremely valuable since it illustrates conclusively that the two components or ingredients are completely compatible with respect to synergistic activity.

The mode of establishing the synergistic behavior of the compositions of the present invention is used extensively and is an industrially acceptable procedure. Although it is believed that the above is sufficient in explaining the procedure for further explanation or modification thereof reference can be made to U.S. Pat. 3,231,509 and its file history where data of this nature was considered to be acceptable. Moreover the article by Kull et al., "Applied Microbiology," 9, 1961—pp. 538-541, will furnish additional information.

For the testing to ascertain synergistic behavior, *Aerobacter aerogenes* was utilized since this microorganism is found to exist and found to be most troublesome in pulp and paper producing processes, as well as in cooling towers. Moreover, this microorganism is difficult to control and/or kill and accordingly its existence does give rise to troublesome slime. In view of the foregoing, it can then be appreciated that since *Aerobacter aerogenes* is prevalent in most slime-affected systems and since this microorganism is difficult to control or kill and in many instances more difficult to kill than fungus such as *Penicillium expansum* and *Aspergillus niger* or algae, that once control of this microorganism is maintained, then for all practical purposes the total microorganism population with its different types is considered to be controlled.

When the inventive compositions are employed in the treatment of cooling or paper mill water, they are preferably utilized in the form of relatively dilute dispersions. For example, a preferred dispersion comprises between 5% to 65% by weight of the synergistic combination in admixture with various solvents and solubilizing agents. An example of such a dispersion comprises 10% by weight of the mixture of 2-nitro-2-ethyl-1,3-dimorpholino propane and N(2-nitrobutyl) morpholine, 10% by weight of bis-(trichloromethyl) sulfone, and the remainder composed by such materials as lower alkanols, surfactants, and organic solvents such as ethylene glycol, dimethyl formamide, etc., aliphatic and aromatic hydrocarbons, etc.

Surfactants such as the alkylaryl polyether alcohols, polyether alcohols, sulfonates and sulfates, and the like, may also be employed to enhance the dispersibility and stability of these dispersions. The foregoing dispersions of the biocidal compositions are utilized in order to insure the rapid and uniform dispersibility of the biocides within the industrial water which is treated. It has been found that non-aqueous solvents, i.e. organic solvents, are generally suitable in the preparation of the dispersions of the invention. Based upon the synergism study as outlined above, it was ascertained that in the treatment of paper-mill and cooling water, effective biocidal action is obtained when the concentration or treatment level of the combination or admixture of ingredients, i.e. the mixture and the sulfone, is between 0.5 part per million to 1000 parts per million, and preferably between 1 and 100 parts per million, based upon the total content of the system treated, i.e. total quantity of cooling water or paper mill water. The compositions may be utilized for preservation of slurries and emulsions containing carbohydrates, proteins, fats, oils, etc. Dosage for this purpose could be in the range of 0.5%. The level of treatment in any case is dependent upon the severity of the problem. This is equally true with respect to the treatment of industrial waters. The compositions of the invention which can be prepared by merely combining the respective ingredients and mixing thoroughly at standard conditions, may be fed continuously to the treated system, e.g. by means of a metered pump, or may be fed periodically at intervals calculated to control the growth of slime-forming organisms in the system. Naturally, in the treatment of cooling water the feeding of the inventive compositions must be designed to compensate for blowdown in those systems which employ that expedient.

Although the sulfone compound has been limited in this description to bis-(trichloromethyl) sulfone, it is obivous that modifications of this compound such as the "bromo" derivative would also perform the same function. Likewise, while the mixture has been described as a 50–50 (weight basis) mixture of the propane and morpholine compounds, it is again obvious that variations in the percentage by weight of the respective ingredients in the mixture would yield the same effects as well as slight chemical modifications of the respective compounds. These modifications would be obvious to the worker in the art once appraised of the invention. Accordingly, modifications of this nature are included in the general scope of the invention.

As would be expected, the inventive compositions may be added to the cooling water or paper or pulp mill systems at any convenient point. Naturally, in once-through or non-circulations systems, the composition must be added upstream from the point or points at which microorganism control is desired. In circulating systems or pulp and paper systems, the compositions may be added at any point, provided the time lapse, and the conditions experienced, between point of addition and the point at which the effect of the composition is experienced are not as drastic as to result in the neutralization of the effect of the composition.

In order to establish the effectiveness of the synergistic combination in combatting or controlling slime formation which was being experienced in various paper and pulp mills; the combination was tested with water samples derived from actual mills. More specifically, actual water samples were taken from pulp and paper mills which were experiencing slime problems due to the microorganism population of the water. As is well known slime problems are generally caused by a combination of microorganisms, which although primarily bacteria and fungi in some cases also include algae. The samples taken were subjected to a Respirometer evaluation which in effect established the property of the synergistic combination at specific treatment levels to inhibit the growth of the microorganisms of the sample.

Respirometer techniques are widely used to evaluate the biocidal activity of the various materials. The techniques and the instruments themselves are described in Manometric Techniques, Umbreit et al., 4th edition, 1964, Burgess Publishing Company, Minneapolis, Minn. Generally, the procedure used entails adding a sample of the water which was taken from the operating mill to a manometer flask together with dilutions of the synergistic combination. The samples of water which were used to evaluate the present combinations were taken from the white water of various pulp and paper mills. The manometer flask is equipped with a center well into which is placed a known volume and concentration of potassium hydroxide. The potassium hydroxide possesses the property of absorbing carbon dioxide. The flasks bearing the respective solutions are attached to the manometer and incubated with shaking in a constant temperature bath. The microbial population in the water sample in normal respiration will consume a certain amount of oxygen from the closed gas phase between the surface of the water sample and the manometer fluid. Concurrent with the consumption of oxygen is the evolution of carbon dioxide which is absorbed by the potassium hydroxide contained by the center well. The changes in manometer settings are related to the utilization of oxygen by the microorganism population in the sample. Inhibition of the respiration of the microbial population by the added synergistic combination is determined by comparing manometer readings with readings obtained from samples treated accordingly which contain no synergistic combination.

The procedure not only measures the effectiveness or the ineffectiveness as the case might be, of the combination to control the respiration of slime forming microorganisms at various treatment levels, but also indicates the effectiveness of the composition in controlling growth of these microorganisms. In addition, the procedure permits correlation of its efficacy or inefficacy with field conditions since actual white water samples from a mill experiencing slime problems are employed. Accordingly, the intended purpose of the product, i.e. the control of slime forming microorganisms found in commercial systems, is directly evaluated.

The methods of producing the compositions of the present invention are quite simple and requires the mere mixing of the ingredients.

Example 2

The compositions evaluated were produced by preparing a composition comprising the following components in the percent by weight basis specified.

| | Percent |
|---|---|
| Mixture of 50% 2-nitro-2-ethyl-1,3-dimorpholino propane and 50% N(nitrobutyl) morpholine (weight basis) | 10 |
| Bis-(trichloromethyl) sulfone | 10 |
| Isopropanol | 10 |
| Non-ionic surfactant octylphenoxy-polyethoxy ethanol (Trition X-114) | 5 |
| Aromatic hydrocarbon solvent (Amsco-F) | 65 |

The results recorded in Table 2 were obtained with the respirometer evaluation method using water sample obtained from an eastern United States fine paper producer.

TABLE 2

Percentage inhibition at—

| | |
|---|---|
| 1.25 p.p.m. | 32 |
| 2.5 p.p.m. | 60 |
| 5.0 p.p.m. | 87 |
| 12.5 p.p.m. | 94 |
| 25 p.p.m. | 95 |
| 50 p.p.m. | 95 |

The results of Table 3 were obtained when evaluation was made using a water sample taken from an Ohio paper and pulp mill. Concurrently an evaluation was conducted for comparison purposes with a commercial biocide which contains 17.0% by weight bis-(trichloromethyl) sulfone and 5% methylene bisthiocyanate. This biocide has been used extensively and successfully in the field.

TABLE 3

| Composition | Percentage inhibition at— | | | | | |
|---|---|---|---|---|---|---|
| | 1.25 p.p.m. | 2.5 p.p.m. | 5.0 p.p.m. | 12.5 p.p.m. | 25 p.p.m. | 50 p.p.m. |
| Example | 11 | 15 | 28 | 49 | 71 | 85 |
| Commercial biocide | 14 | 27 | 44 | 73 | 84 | 89 |

For all practical purposes, the effectiveness of the present composition compared favorably with the commercially available synergistic composition.

In order to ascertain whether in fact the inventive compositions were effective in controlling fungi, evaluations were made following the procedure as described by Shema et al., "Journal for the Technical Association of the Pulp and Paper Industry," 36, pp. 20A–30A, 1953. The described procedure generally entails incorporating the biocide under test in a nutrient substrate such as agar, malt, etc., and pouring the resulting medium in a Petri dish and allowing the medium to solidify. A button of fungus inoculum is placed on the surface of the solidified medium and the medium is incubated for a period of 14 days. After this period, the diameter of the colony is measured and compared with the diameter of the bottom of inoculum originally placed upon the surface. If there is no increase in the diameter, the growth of the fungus is considered to be completely inhibited and the treatment dosage which effectuates this is considered the inhibitory concentration.

The fungi species utilized as the test microorganisms in order to evaluate the efficacy of the present compositions were *Penicillium Expansum* and *Aspergillus niger*. The evaluation revealed that the composition of Example 2 inhibited the growth of *Penicillium expansum* at a treatment level of 60 p.p.m. while 120 p.p.m. completely inhibited the growth of *Aspergillus niger*.

Accordingly, since the waters of pulp and paper mills and the water of cooling water systems generally predominantly contain bacteria such as *Aerobacter aerogenes* and some fungi such as *Penicillium expansum* and *Aspergillus niger*, it is apparent from the foregoing evaluations and studies that the inventive compositions will effectuate the claimed objective of controlling microorganism populations of aqueous systems.

It should be noted that while the preponderance of evidence has been derived from the treatment of samples taken from paper and pulp mill aqueous systems, the compositions and methods of the present invention are broadly applicable to the treatment of aesthetic waters as well as industrial waters such as cooling waters which are plagued by deposits formed by slime forming organisms, or by the very presence of such organisms.

Having thus described the invention, what is claimed is:

1. A composition for controlling slime comprising the combination of between about 5% to 95% by weight of a mixture comprising about 50% by weight of each of 2-nitro-2-ethyl-1,3-dimorpholino propane and N(2-nitrobutyl) morpholine and between about 95% to 5% by weight of bis(trichloromethyl) sulfone.

2. A composition according to claim 1 which said sulfone is present in a quantity of about 50% by weight and said mixture is present in a quantity of about 50% by weight.

3. A composition as claimed by claim 1 in which between 5% to 65% by weight of said combination is dispersed in between 35% to 95% by weight of a non-aqueous solvent.

4. A composition as claimed by claim 3 in which said non-aqueous solvent is a mixture of a lower alkanol, a surfactant, and an aromatic hydrocarbon solvent.

5. A method for the control of slime in aqueous systems comprising adding to said system an effective amount of a combination comprising between about 5% to 95% by weight of a mixture comprising about 50% by weight of each of 2-nitro-2-ethyl-1,3-dimorpholino propane and N-(2-nitrobutyl) morpholine and between about 5% to 95% by weight of bis(trichloromethyl) sulfone.

6. A method according to claim 5 in which said combination is added to said system in amount between 0.5 to 1000 parts per million parts of water.

7. A method according to claim 6 wherein said combination is added to said system as a dispersion of between 5% to 65% by weight of said combination dispersed in between 35% and 95% by weight of a non-aqueous solvent.

8. A method as claimed by claim 6 in which said sulfone is present in a quantity of 50% by weight and said mixture is present in a quantity of 50% by weight.

9. A method as claimed in claim 8 in which said admixture is added to said system as a dispersion of between 5% to 65% by weight of said admixture in between 35% to 95% by weight of a non-aqueous solvent.

10. A method as claimed by claim 9 in which said non-aqueous solvent is a mixture of a lower alkanol, surfactant, hexylene and an aromatic hydrocarbon solvent.

11. A method as claimed by claim 6 wherein said aqueous system is the aqueous system of a paper and pulp mill.

12. A method as claimed by claim 6 wherein said aqueous system is a cooling water.

References Cited
UNITED STATES PATENTS

| | | | |
|---|---|---|---|
| 3,054,748 | 9/1962 | Hodge | 242—248 |
| 3,054,749 | 9/1962 | Bennett et al. | 424—248 |
| 3,231,509 | 1/1966 | Shema | 424—301 |
| 3,426,134 | 2/1969 | Shema et al. | 162—161 |

JAMES O. THOMAS, Jr., Primary Examiner

U.S. Cl. X.R.

162—161, 190; 210—64